United States Patent [19]
Johnson

[11] 4,128,258
[45] Dec. 5, 1978

[54] EXTENSIBLE UTILITY WAGON

[76] Inventor: Robert Johnson, 19419 Wickfield Ave., Cleveland, Ohio 44122

[21] Appl. No.: 822,067

[22] Filed: Aug. 5, 1977

[51] Int. Cl.$^2$ ............................................. B62D 21/14
[52] U.S. Cl. ..................................... 280/656; 280/46; 296/43
[58] Field of Search .......... 280/638, 656, 659, 79.1 R, 280/46, 503; 248/100; 296/43

[56] References Cited
U.S. PATENT DOCUMENTS

| | | | |
|---|---|---|---|
| 769,507 | 9/1904 | Stow | 280/79.1 R |
| 1,095,036 | 4/1914 | Schulze | 280/659 X |
| 1,180,327 | 4/1916 | Simpson | 280/638 |
| 1,786,093 | 12/1930 | Swick | 280/503 |
| 2,583,358 | 1/1952 | Cesan | 280/638 X |
| 3,216,686 | 11/1965 | Bjerre | 248/100 |

*Primary Examiner*—Robert R. Song
*Attorney, Agent, or Firm*—Howard I. Podell

[57] ABSTRACT

A utility wagon which is adjustable has a longitudinally extensible, frame with means for locking same in any of its three dimensions. Wheels are provided under the frame. A grid-like platform of floor boards in separate sections, corresponding to the three dimensions of the frame is removably fitted on the open upper side of the frame, and a plurality of spaced upright members are mounted on the frame to support a load thereon. A removable front wheel assembly with a handle or a hitch for attaching to a towing vehicle is mounted on the frame.

3 Claims, 1 Drawing Figure

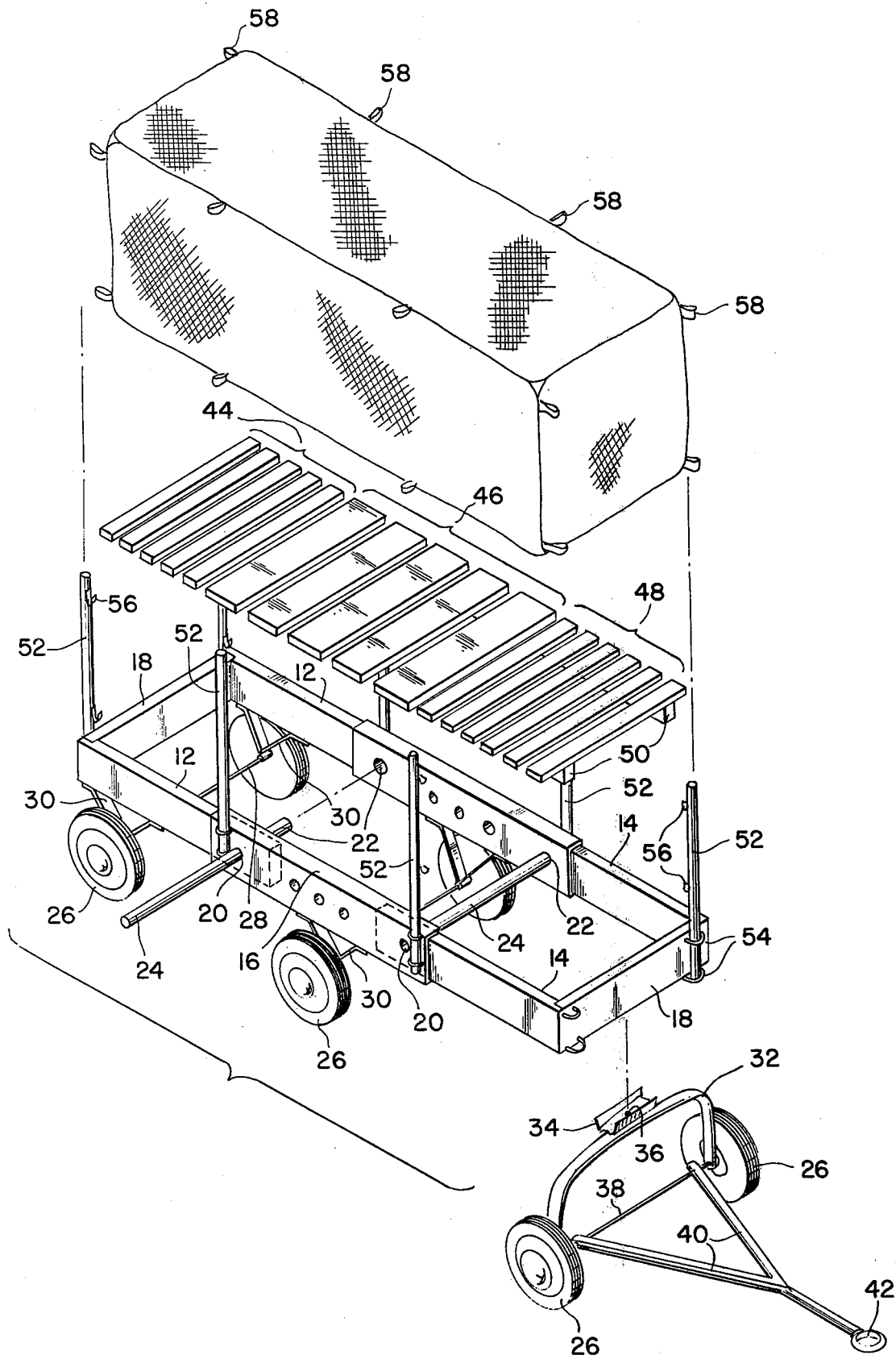

EXTENSIBLE UTILITY WAGON

FIELD OF THE INVENTION

This invention relates generally to a utility wagon.

STATEMENT OF PRIOR ART

The prior art, as exemplified by U.S. Pat. Nos. 1,803,264; 1,397,446; and 1,417,125 is generally illustrative of various devices of this type. While such devices are generally acceptable for their intended purpose, they have not proven to be entirely satisfactory in that they are either complex and expensive to manufacture, or bulky and inconvenient to use or operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The main object of this invention is to provide an extensible load-supporting wagon which is economical to manufacture and simple to adjust for altering its length to accommodate longer and shorter loads. The wagon can be pulled manually or towed.

Other objects of this invention will in part be obvious and in part hereinafter pointed out.

BRIEF DESCRIPTION OF THE DRAWING

In the accompanying drawing, in which is shown and illustrated one of the possible illustrative embodiments of this invention, wherein like reference character identify the same or like parts:

The single feature shows the wagon of the invention with its component parts separated.

DESCRIPTION OF THE PREFERRED EMBODIMENT

With reference to the drawing, there is shown and illustrated a utility wagon constructed in accordance with the principles of the invention and designated generally by reference character 10.

Referring to the drawing, the wagon 10 includes a telescopic construction consisting of two pair of side members 12 and 14 fitting in slides 16 and connected at their ends by cross members 18. The inner ends of members 12 and 14 have an opening 20 adapted to register with openings 22 in each end of slides 16. Once members 12 and 14 are engaged in slides 16, the openings thereof needed to obtain the desired length of frame are brought into register with openings 22 of the slides. Then pin 24 is passed through to lock the assembly in place. Four wheels 26 on axles 28 are secured below members 12 and slides 16 by means of braces 30.

The front wheel assembly includes a cross-member 32 with a flanged piece 34 which is secured by screws or rivets 36 to cross-piece 18. Wheels 26 are journalled to axle 38 supported by the ends of member 32. Also mounted for vertical movement on axle 38 is a fork member with steering arms 40 integral with hitch 42 forming a handle which can be pulled or attached to a vehicle. Preferably, the adjustable frame above described is 3 feet wide and fully extended is 9 feet long with intermediate lengths of 5 and 7 feet. Three separate sections 44, 46, and 48 of floor boards are individually connected by depending plates 50. Plates 50 are spaced at a distance such to engage frictionally members 12, 16, and 14, respectively.

A number of 3 foot high posts 52 are frictionally engaged in brackets 54 on the frame. Posts 52 have spaced hooks 56 which engage rings 58 on plastic bag 60. This bag can contain 3 cubic yards of leaves. To remove the bag, the rings are slipped off the hooks and pulled over the desired side.

The 7 foot length wagon can carry ¾ of a cord of wood.

The 5 foot long version can be used for supermarket shopping, laundry, light freight pick-up and deliveries and general outdoor hauling tasks. The 7 to 9 feet utility wagon may be attached to a riding mower or snowmobile.

The utility wagon of this invention can be broken down easily into 3 sections for winter storage or converted into a tow sled attached to a snowmobile. This can be done by removing the wheels and replacing them by individual short (18 inches) ski-type runners.

The device of the invention has been thoroughly tested under actual use conditions and has been found to be completely successful for the accomplishment of the above stated objects of the invention.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefor, a more lengthy description is deemed unnecessary.

It is to be understood that various changes in shape, size, and arrangement of the elements of this invention as claimed may be resorted to in actual practice, if desired.

Having thus described the invention, what is claimed as new and to be secured by Letters Patent is:

1. A utility wagon comprising, in combination, a front section supported on front wheels, towing means vertically movable and secured to said front wheels, an open rear section supported on rear wheels, an open central section supported on wheels and slidably receiving said front and rear sections so that said sections may be telescoped and extended relative to said central section, removable means for locking said front and rear sections on said central section at a selected extension; front, central and rear floor board units adapted to frictionally engage the boundary of the open area of said open sections and a plurality of upright posts removably mounted at spaced intervals on said sections to support a load said removable locking means consisting of a plurality of individual bars, each of which extends substantially for the full width of the wagon in the assembled position, through holes in the joined sections, oriented parallel to the transverse axis of the wagon.

2. The invention as recited in claim 1 further including hooking means on said posts, and a load carrying bag having rings thereon for securing to said hooks, in which each said post is fitted with a pair of hooks spaced vertically apart from each other and located so as to each engage an individual ring of the said bag.

3. The invention as recited in claim 1, wherein said front wheels are mounted on an axle on the ends of a cross member; there being a forked member mounted for vertical member on said axle, said forked member terminating in a hitch or handle.

* * * * *